United States Patent
Shi et al.

(10) Patent No.: US 6,772,733 B2
(45) Date of Patent: Aug. 10, 2004

(54) OPTICALLY CONTROLLED IPCS CIRCUITRY

(75) Inventors: Zhong-You Shi, Ann Arbor, MI (US); Bernard A. Meyer, Taylor, MI (US); Harvinder Singh, Shelby Township, MI (US); Jay DeAvis Baker, West Bloomfield, MI (US); Lawrence Leroy Kneisel, Novi, MI (US); Richard Keith McMillan, Dearborn, MI (US); David James Steinert, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/271,205

(22) Filed: Oct. 15, 2002

(65) Prior Publication Data

US 2003/0089335 A1 May 15, 2003

Related U.S. Application Data

(60) Provisional application No. 60/330,306, filed on Oct. 19, 2001.

(51) Int. Cl.[7] .................................................. F02P 5/00
(52) U.S. Cl. .................................. 123/406.12; 123/477
(58) Field of Search ........................... 123/406.12, 477, 123/143 C, 470

(56) References Cited

U.S. PATENT DOCUMENTS

| 3,448,616 A | 6/1969 | Wostl et al. |
| 3,463,134 A | 8/1969 | Zechnall et al. |
| 3,895,612 A | 7/1975 | Keely et al. |
| 4,080,939 A | * 3/1978 | Love ...................... 123/406.12 |
| 4,134,639 A | 1/1979 | DiVita |
| 4,269,152 A | 5/1981 | Van Siclen, Jr. |
| 4,447,118 A | 5/1984 | Mulkey |
| 4,488,530 A | * 12/1984 | Turetsky ...................... 123/477 |

(List continued on next page.)

FOREIGN PATENT DOCUMENTS

| DE | 2839127 A | 3/1980 |
| EP | 0266934 A1 | 5/1988 |
| EP | 0454165 A2 | 10/1991 |
| GB | 2 164 516 A | 3/1986 |
| GB | 2 177 869 A | 1/1987 |
| JP | 60183630 A | 9/1985 |
| JP | 61106930 A | 5/1986 |
| JP | 2207204 A | 8/1990 |
| WO | WO 89/09324 | 10/1989 |

Primary Examiner—Bibhu Mohanty
(74) Attorney, Agent, or Firm—Brinks Hofer Gilson & Lione

(57) ABSTRACT

An integrated control system comprising an integrated circuit that controls at least one component or subsystem of an engine and a first light source that generates a first light signal when triggered through the integrated circuit. The first light signal propagates from the first light source through an LCC that may also serve as a substrate, wherein the signal that actuates the component of the engine can be the first light signal or a signal generated after the first light signal is produced. The component or subsystem of the engine may be an ignition system or a fuel injection system. The present invention is also directed to a method of controlling a component or subsystem of an engine.

18 Claims, 4 Drawing Sheets

U.S. PATENT DOCUMENTS

| | | | |
|---|---|---|---|
| 4,604,982 A | * | 8/1986 | Turetsky .................... 123/477 |
| 4,674,828 A | | 6/1987 | Takahashi et al. |
| 4,745,293 A | | 5/1988 | Christensen |
| 4,757,212 A | | 7/1988 | Saito |
| 4,789,214 A | | 12/1988 | Vilhelmsson et al. |
| 4,817,466 A | | 4/1989 | Kawamura et al. |
| 4,851,969 A | | 7/1989 | Davenport et al. |
| 4,912,522 A | | 3/1990 | Oates et al. |
| 4,928,319 A | | 5/1990 | Pitt et al. |
| 4,963,729 A | | 10/1990 | Spillman et al. |
| 5,001,642 A | | 3/1991 | Botzenhardt et al. |
| 5,077,482 A | | 12/1991 | Vali et al. |
| 5,089,696 A | | 2/1992 | Turpin |
| 5,214,707 A | | 5/1993 | Fujimoto et al. |
| 5,226,090 A | | 7/1993 | Kimura |
| 5,247,580 A | | 9/1993 | Kimura et al. |
| 5,291,032 A | | 3/1994 | Vali et al. |
| 5,328,665 A | | 7/1994 | Geiger |
| 5,380,014 A | | 1/1995 | Schäperkötter |
| 5,384,467 A | | 1/1995 | Plimon et al. |
| 5,521,992 A | | 5/1996 | Chun et al. |
| 5,539,200 A | | 7/1996 | Lebby et al. |
| 5,659,132 A | | 8/1997 | Novak et al. |
| 5,693,936 A | | 12/1997 | Komachiya et al. |
| 5,745,611 A | | 4/1998 | Komachiya et al. |
| 5,822,099 A | | 10/1998 | Takamatsu |
| 5,831,263 A | | 11/1998 | Komachiya et al. |
| 5,872,609 A | | 2/1999 | Hiji et al. |
| 5,936,235 A | | 8/1999 | Minamitani et al. |
| 6,150,734 A | | 11/2000 | Neibecker et al. |
| 6,173,609 B1 | | 1/2001 | Modlin et al. |
| 6,186,106 B1 | | 2/2001 | Glovatsky et al. |
| 6,230,138 B1 | | 5/2001 | Everhart |
| 6,240,347 B1 | | 5/2001 | Everhart et al. |
| 6,301,030 B1 | | 10/2001 | Robinson |
| 6,301,957 B1 | | 10/2001 | Sakaguchi et al. |
| 6,320,184 B1 | | 11/2001 | Winklhofer et al. |
| 6,357,426 B1 | | 3/2002 | Schleupen |
| 2001/0019568 A1 | | 9/2001 | Sakata |

\* cited by examiner

OPTICALLY CONTROLLED IPCS CIRCUITRY

This application claims the benefit of a U.S. Provisional Application No. 60/330,306 filed on Oct. 19, 2001, the entirety of which is incorporated herein.

FIELD OF THE INVENTION

The present invention relates to an integrated optoelectronic control system for controlling a component or subsystem of an engine. In particular, the present invention relates to an integrated optoelectronic control system for controlling a component or subsystem of an engine that uses a light signal and a light communication channel to activate or control an engine component.

BACKGROUND OF THE INVENTION

Electronic components are commonly mounted on the surface of conventional molded three-dimensional substrates. Presently, communications between the components on such a substrate occur mainly through the use of hole drillings, electrical wirings, and other conventional connectors. However, reliance on conventional connection techniques creates various disadvantages such as added complexity in component assembly, inconsistent connector reliability due to the large number of required wirings, signal interference and cross-talking between adjacent wires, increase in the weight of the substrate, and high production cost.

BRIEF SUMMARY OF THE INVENTION

In one aspect of the invention, an integrated control system is provided that comprises an integrated circuit that controls at least one component of an engine and a first light source that generates a first light signal when triggered through the integrated circuit. The first light signal propagates from the first light source through a light communication channel (LCC), wherein the signal that actuates the component of the engine can be the first light signal or a signal generated after the first light signal is produced.

In another aspect, an integrated control system is provided that includes an integrated circuit that controls an ignition system of an engine. A first light source generates a first light signal when triggered through the integrated circuit. The first light signal propagates through an LCC from the first light source. A signal that actuates the ignition system of the engine is either the first light signal or a signal generated after the first light signal is produced.

In another aspect, an integrated control system is provided that includes an integrated circuit that controls a fuel injection system of an engine. A first light source generates a first light signal when triggered through the integrated circuit. The first light signal propagates through an LCC from the first light source. In an aspect of the invention, the LCC also serves as a substrate. A signal that actuates the fuel injection system of the engine can be either the first light signal or a signal generated after the first light signal is produced.

The present invention is also directed to a method of controlling a combustion process in an engine. In one aspect, the method comprises using an integrated circuit in an integrated control system to control a light source. The light source generates a first light signal that propagates through an LCC, which may also act as a substrate. A component of a combustion system of the engine is actuated using either the first light signal or a signal generated after the first light signal is produced.

The integrated circuit is preferably an optoelectronic chip. The integrated control system of the invention may further comprise a molded cover that can serve as a signal medium. In one aspect, the light signal propagates through an LCC along an edge of a substrate. The light signal may also propagate at a location on a surface of the LCC where physical scratches or indentations are made to allow the light signal to exit and reach a signal receiver.

In one aspect of the invention, a coded light signal is used for communication between at least one signal source and at least one signal receiver. The coded light signal may comprise a light signal with a single wavelength.

Communication between a signal source and a plurality of signal receivers may occur through a shared LCC. Communication among a plurality of signal sources and a plurality of signal receivers may also occur through a shared LCC. In one aspect, substrate also acts as a signal carrier.

A single signal source may communicate simultaneously with a plurality of signal receivers. A signal source for an ignition system and a signal source for a fuel injection system may also transmit a signal through a shared LCC. A signal source can be an optoelectronic transmitter or an optoelectronic transceiver.

In one aspect, a light signal propagates through an optical fiber molded in a substrate. The component of the combustion system of the engine includes an ignition system and fuel injection system.

DETAILED DESCRIPTION OF THE INVENTION

The various aspect of the present invention is directed to the use of optical signal to drive and control an Integrated Power-train Control System (IPCS) circuitry. This type of IPCS is a hybrid circuit that can be driven and controlled not only by electrical but also by optical signals. In a conventional IPCS circuit of an 8-cylinder engine, for example, one integrated circuit (IC) controls the timing of firing of four spark plugs on one side of the engine. Another IC controls the timing of firing of the other four spark plugs on the other side of the engine. Eight IC chips individually control the on/off state of fuel injection into each cylinder, i.e., one IC controls one valve.

The hybrid electrical/optical communication system of the present invention offers several advantages. First, sensitive circuit components benefit from the system's reduced electromagnetic interference. In the case where light channels are made an integral part of the printed circuit board substrate, the hybrid system's whole structure weighs less than its conventional counterparts. In addition, the hybrid IPCS of the present invention facilitates the inspection and diagnosis of, for example, problematic cylinders because a particular cylinder can be easily turned off by flooding light on its receivers. Moreover, the IPCS systems of the present invention can be fabricated at reduced costs. Further, the hybrid circuit of the present invention can be used in conjunction with or as part of other related circuits.

In the present invention, one or two optoelectronic devices, e.g., transmitters, control the timings of the firing of, for example, eight spark plugs. The signals that such devices send out can be light pulses representing digital or analog signals. The optical pulses can be received and used to switch a charging coil on and off such that a firing spark is generated to ignite the fuel/air mixture. Similarly, the eight IC chips that control the opening and closing of the valves for fuel injection can also be replaced by optoelectronic chips. The optical signal they send out actuates the opening and closing of the fuel injection valves.

Figure 2:
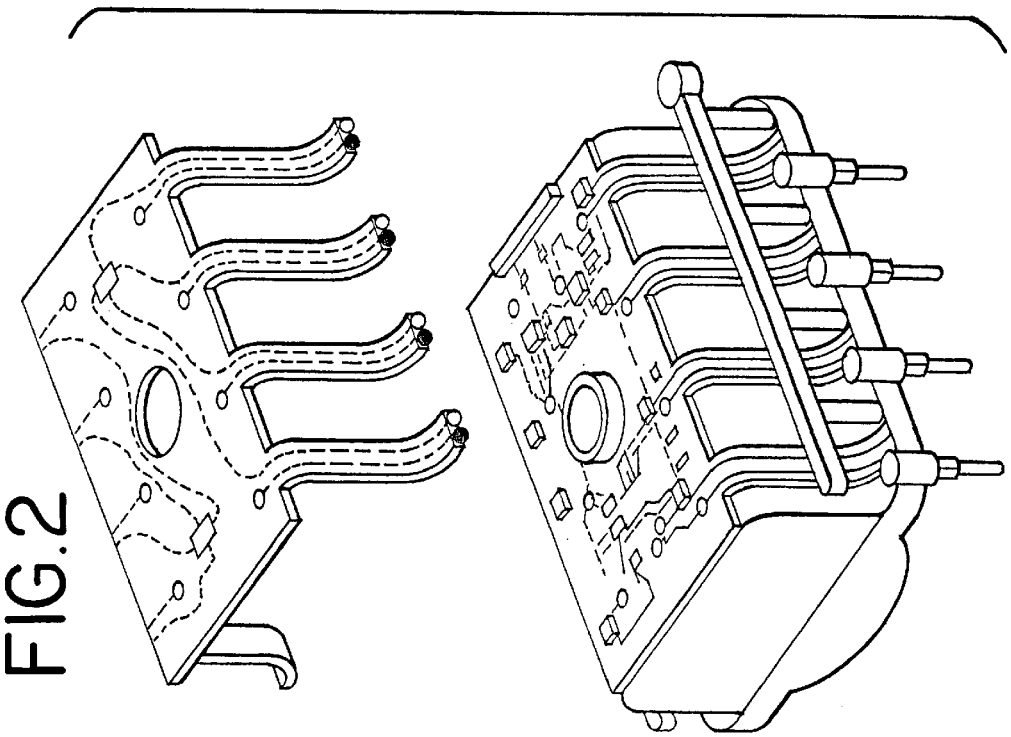
FIG. 2 shows an IPCS configuration in which signal transmission occurs through optical fibers that are molded-in with the substrate.

The optical signals from these optoelectronic transmitters can be transmitted through air if no obstacles block their path. Preferably, each signal source such as a transmitter or transceiver generates a unique wavelength of light signal. A wavelength selective filter may be placed in front of a signal receiver to block interference from signals originating from other transmitters and receivers. Communication through air can also be achieved using light of a single wavelength (or light with a narrow wavelength range) for all the transmitters and receivers by incorporating a code before each signal so that only the desired or intended receivers would be able to recognize the code and respond to the signal. The non-targeted receivers would thus be prevented from generating undesired signals or responses. FIG. 2 illustrates this aspect of the invention.

The optical signals can also propagate inside a signal medium or a light communication channel made of a material such as plastic or other types of polymer. Using air or at least one type of material that has a lower refractive index than that of the core medium as cladding, the signal can be transmitted inside the substrate via internal reflection. The signals can then, for certain configurations, either propagate out of the plastic medium at the edge of substrate, or at locations where physical scratches are made on the surface of the media to allow the optical signal to exit and reach the receiver. In this case, the plastic medium in the form of, for example, a plastic sheet, can be used as a light-conducting medium, in addition to the medium's being a substrate, or part of a substrate, of a printed circuit board, flat wire, or a molded three-dimensional plastic structure. Thus, the light signals, after being emitted from a signal source, can spread and propagate into a large area inside the plastic substrate. Thus, multiple receivers at various locations can detect signals from several different transmitters simultaneously. Different transmitters and/or receivers can be distinguished from one another using various means such as by using light signals with different wavelengths, filters, and pre-coding of digital signals.

Figure 3:
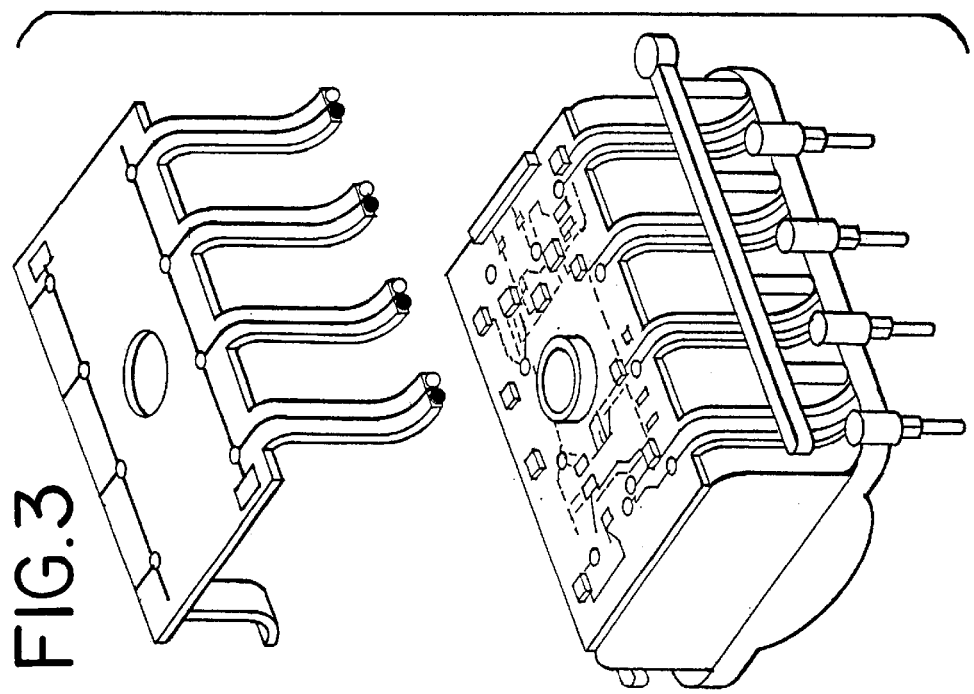
FIG. 3 shows an IPCS configuration that allows the use of a shared LCC (or a shared light-guide or wave-guide) for communication between multiple receivers/slaves or discretely between a signal source and signal receiver.
Figure 4:
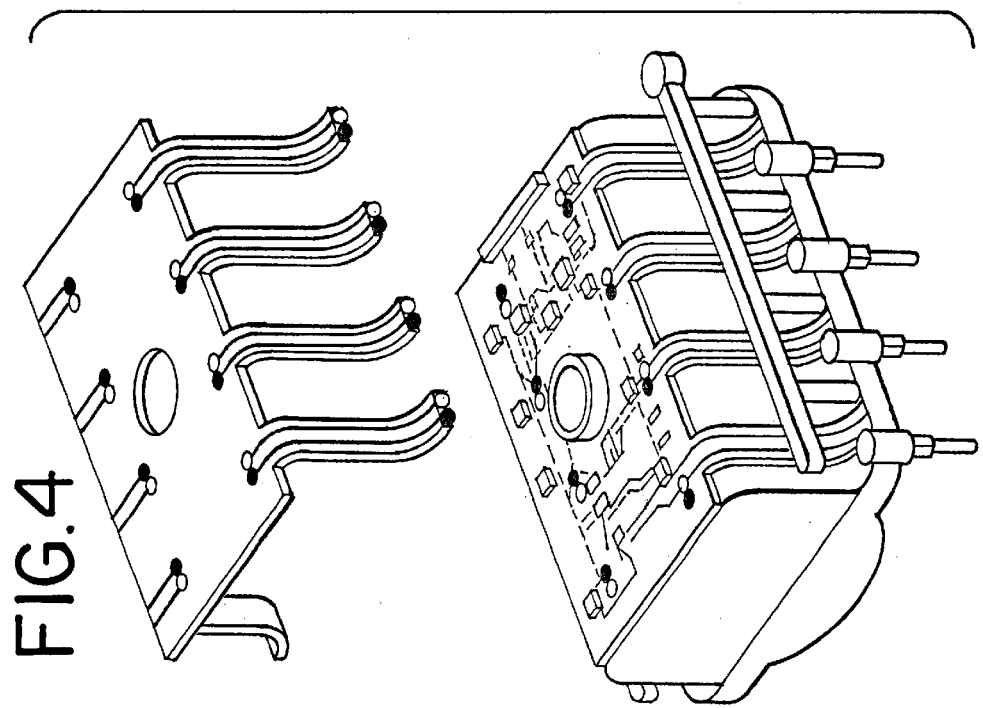
FIGS. 4–5 show IPCS systems in which the light signal travels in a molded wave guide or an LCC blanket or sheet.

An isolated portion of the substrate can be used as a light channel such that a light signal from a transmitter travels only inside this channel towards a target receiver. These isolated light channels can be made an integral part of an entire substrate such as a plastic substrate. FIG. 3 illustrates this scheme. FIG. 4 illustrates a particular configuration of FIG. 3 in which embedded optical fibers are used as isolated light channels. Because the light channels in this configuration do not interfere with each other, this configuration allows the use of a single wavelength of light for communications between a plurality of signal sources and a plurality of signal receivers.

Preferably, the IPCS circuit allows the use of both optical and electrical signals. Two integrated circuits (IC) that control the timing of a firing of, for example, the eight spark plugs of an 8-cylinder engine can be replaced with one optoelectronic device such as a transmitter. Light signals, as opposed to electrical signals of a standard power distribution system, can be transmitted as digital signals. The light signals received at each cylinder spark plug location can be used to switch an ignition coil on and off so that an electrical firing spark is generated to ignite and combust an air and fuel mixture in a cylinder. In another aspect of the invention, optoelectonic chips in a fuel injection system replace conventional I/C chips that control the opening and closing of valves in the fuel injection ports.

Figure 1:
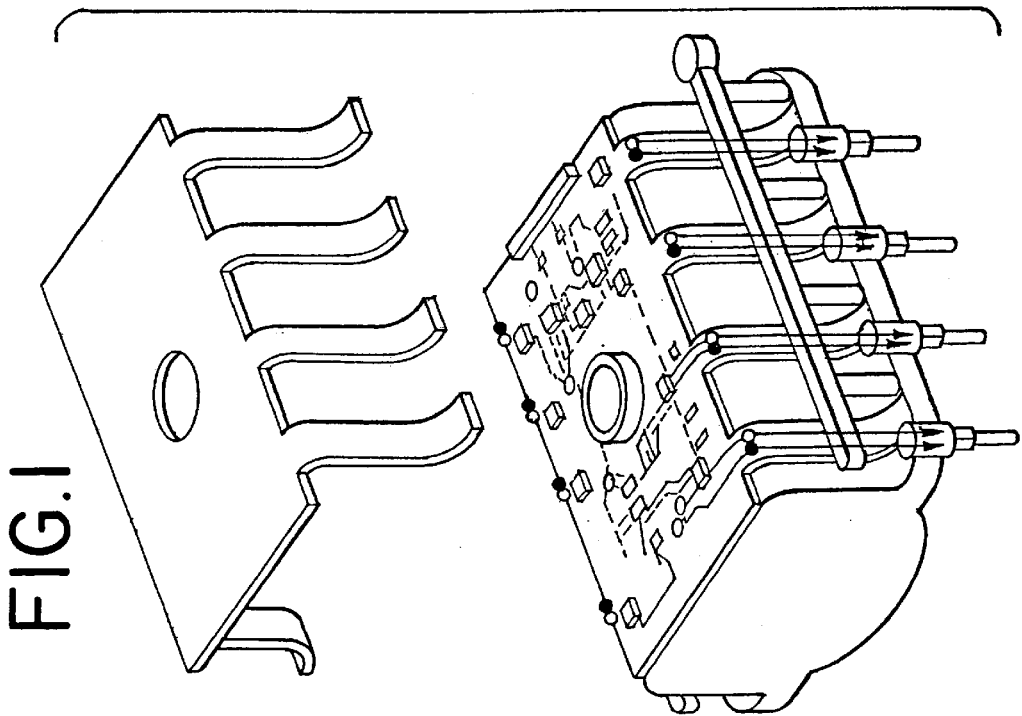
FIG. 1 shows a molded-in plastic carrier (upper figure) for use in supporting the electronic engine control (EEC) circuit.

FIG. 1 shows a molded-in plastic carrier (upper figure) for use in supporting the electronic engine control (EEC) circuit. This molded cover can also be used as a waveguide or light channel depending on the particular configuration of the electronics and devices. FIG. 1 also shows an EEC mounted on a manifold (lower figure). In this configuration, every cylinder may have an individual emitter for each firing spark cylinder and for each fuel injection port. The signals may be transmitted using RF communication, for example. The configuration in FIG. 1 permits signal transmission through air. Preferably, each transmitter generates a light signal that has a unique wavelength. A wavelength-selective filter may be placed in front of a receiver to prevent or reduce interference between different transmitters and receivers. A single wavelength of light may also be used for signal transmission through air, even when multiple transmitters and receivers are involved, by incorporating a code in each signal. In this case, only a target or intended signal receiver can recognize the code and respond to the signal.

FIG. 2 shows an IPCS configuration in which signal transmission occurs through optical fibers that are molded-in with the substrate which may be made of a material such as plastic. These isolated light channels can also be embedded optical fibers. In this configuration, a single wavelength of light can be used for all communications since the light paths do not cross or interfere with each other. This configuration benefits from a compact design due to the integration of the components.

FIG. 3 shows an IPCS configuration that allows the use of a shared LCC (or a shared light-guide or wave-guide) for communication between multiple receivers/slaves or discretely between a signal source and signal receiver. The optical signals may also propagate inside a medium made of a material such as plastic. In the configuration shown, multiple sources and receivers share the same light channel and exchange information over the same network. This configuration offers the advantage of multiplexing and data exchange between some or all sources without the need for dedicated resources. A single controller can communicate with multiple receivers at the same time. In addition, the speed of this system configuration is not dependent on the slowest node because multiple tasks can be performed at the same time.

Figure 5:
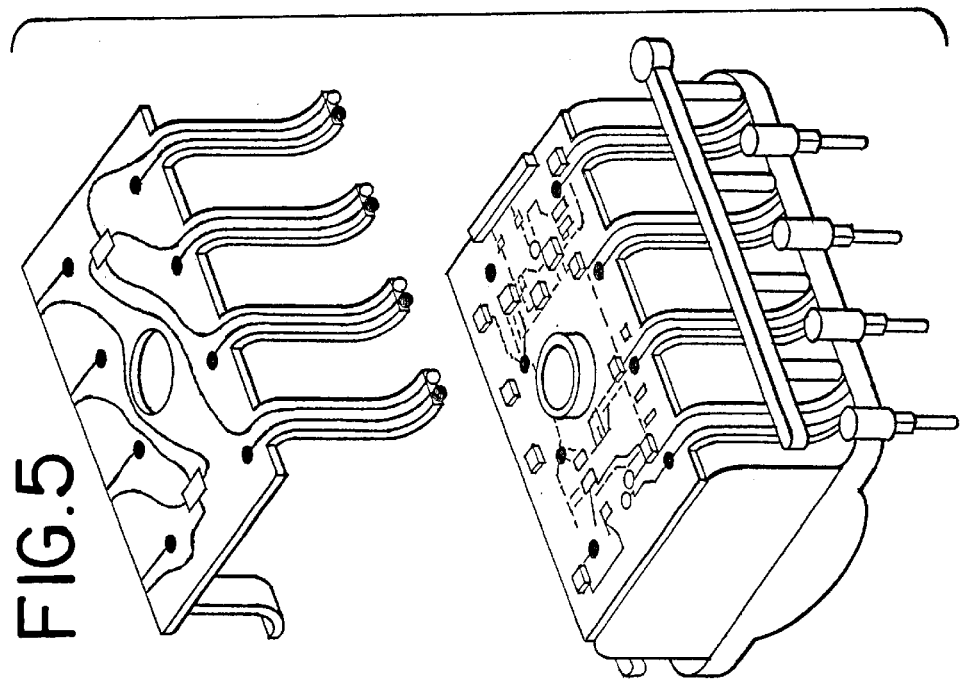

FIGS. 4–5 represent an IPCS system in which the light signal travels in a molded wave guide. FIGS. 4–5 show an IPCS configuration that allows communication through an LCC blanket or sheet. In these configurations, multiple digital and analog signals can be transmitted over the same waveguide or light channel without interference. Thus, optical signals can routed through the system such that they do not interfere when they reach a signal receiver. Multiple digital signals can be sent simultaneously using various communication protocols. Digital signals can be coded and encoded at the source and receiver. The optical signal can also propagate inside a plastic media. This media can be of any shape depending on the requirements and may or may not be integrated with existing components or parts of the system. In this configuration, the IPCS can be configured so that a transmitter for the firing spark and the fuel injection may use the same light channel.

Figure 6:
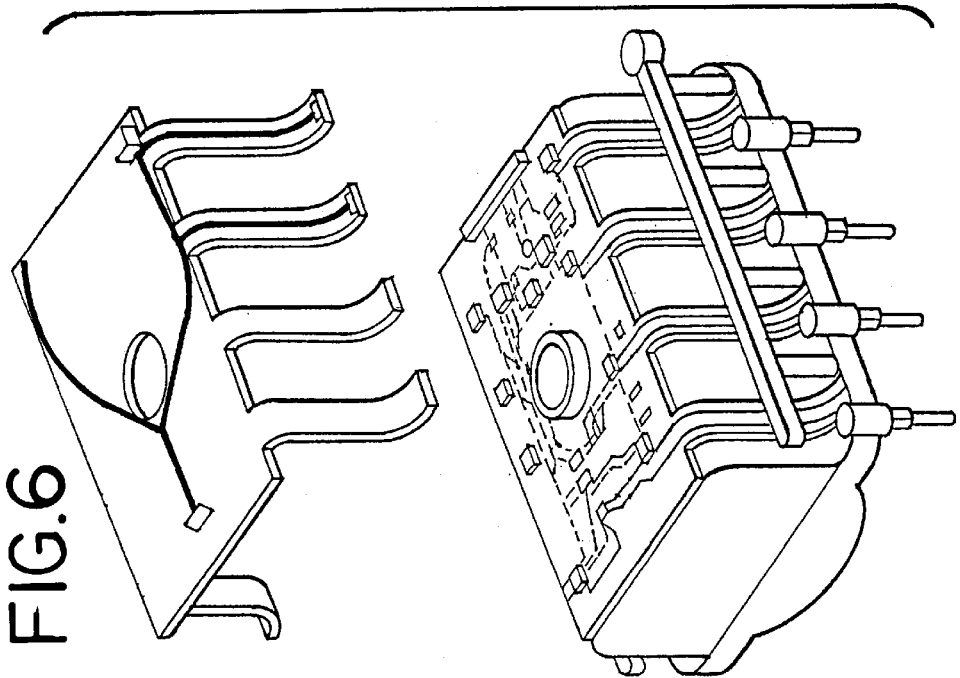
FIG. 6 depicts another configuration of an LCC-based IPCS.

FIG. 6 depicts another configuration of an LCC-based IPCS. A directional splitter reroutes a light signal using an insert molded piece plastic, metal, or a rough surface to diffuse the light signal when necessary to avoid an obstacle along a path. Molded-in reflectors may be used to redirect the light signal to a desired location.

Figure 7:
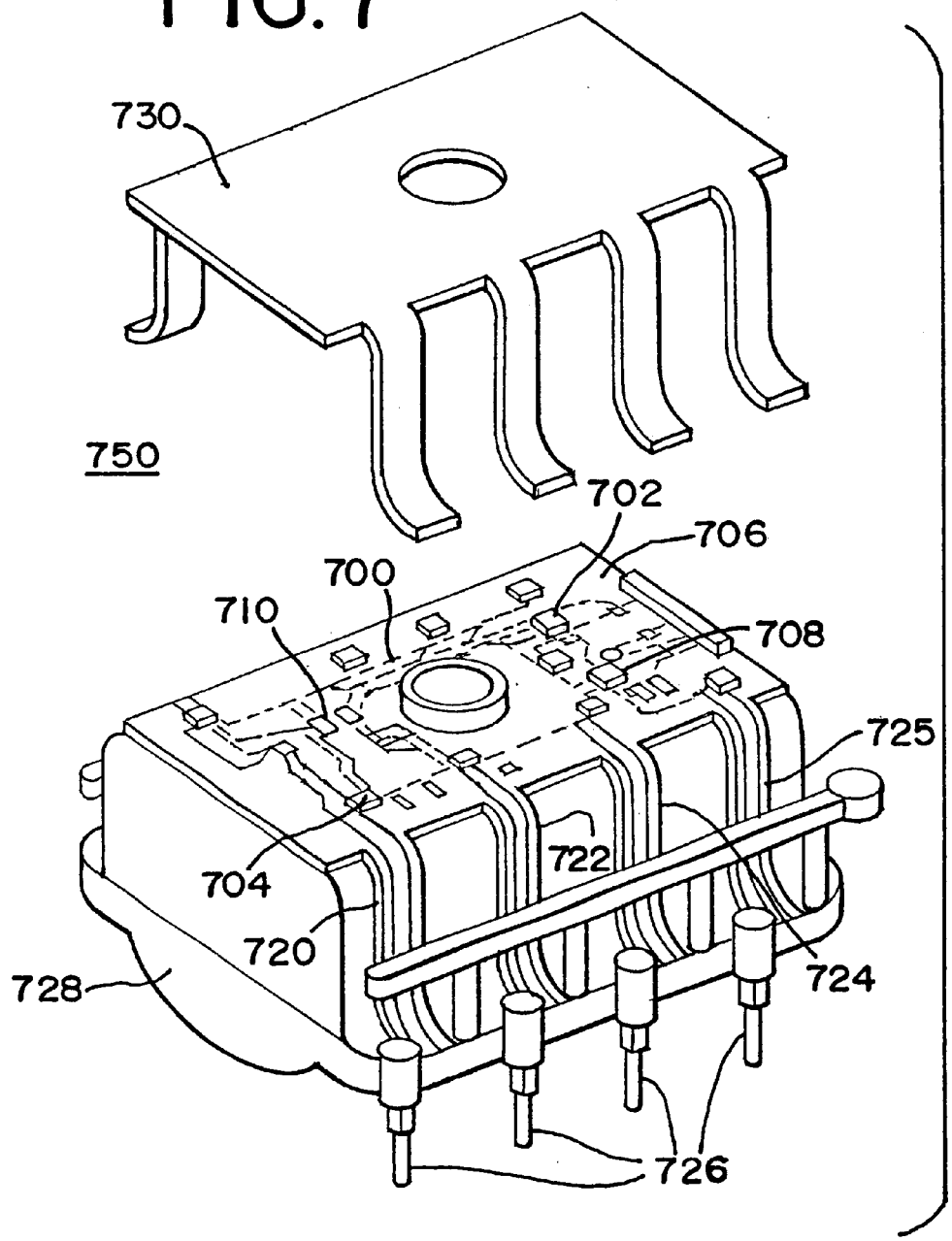
FIG. 7 depicts another configuration of an LCC-based IPCS.

FIG. 7 depicts another configuration of an LCC-based IPCS. The system includes power sources 702, 704, an electronic system 750, and an LCC sheet 706. The electronic system 750 may be an integrated power train control system or another electronic system. The electronic system 750 preferably has a base 728 and a cover 730. The electronic system 750 may comprise power sources 702, 704, an LCC sheet 706, and collectors 708 and 710. Preferably, the LCC sheet 706 is disposed across and may be incorporated with the base 728. The power sources 702, 704 and sensors 708, 710 can be linked by wires 720, 722, 724, 726 to pin connections 728 which are preferably connected to other components. The power sources 702, 704 preferably transmit signals in response to an input signal from the pin connections 728. The sensors 708, 710, 712 preferably transmit an output signal to the pin connections 728 in response to the signals from the power sources 702, 704.

In the present invention, signal receivers preferably have at least one photo-voltaic receptors that converts light energy into electrical energy. The electrical energy can then be used to power the signal receivers. In one aspect, the electrical energy is stored in a capacitor and used as needed.

The signal receivers are preferably embedded within the matrix or attached to it. In one aspect of the invention, an emitted signal or energy from the central signal source may be directed to the signal receivers using a routing means such as a prism, lens, or mirror through the matrix.

Power sources that produce energies corresponding to different wavelengths may be used to power different signal receivers that have photoreceptors sensitive to certain wavelengths. Further narrowing of a wavelength range may be performed using at least one optic element such as bandpass filter.

Data obtained from the signal receivers may be transmitted through a main communication bus to an electronic system, such as an electronic controller, for further data processing. The data may be transmitted using a light signal, such as an IR signal. A power distribution system may also be included in an instrument panel, on-engine system, or other devices that require power distribution to the signal receivers.

An LCC, otherwise known as light communication channel, is a structure made of at least one type of light-transmissive material formed into any shape that would allow transmission of a signal in the form of light from one point to another. An LCC is described in more detail below, but one of its characteristics is that it can be used as a substrate, such as an optical substrate, that can be formed into various shapes such as a rectangular slab or the shape of a part or the entirety of, for example, a main frame of an instrument panel display. As such, it can be used as a primary or secondary transmission means for a signal, such as an optical signal propagating from at least one signal source to at least one signal receiver. An LCC may encompass various electronic and/or optical components to allow a signal, such as an optical signal, to be directed to various electronic and/or optical components within the substrate without having to resort to the use of conventional signal focusing means such as a beam splitter or focusing lens. An LCC may also assume other shapes such as a ring, strand, sheet, or ribbon.

As used herein, an LCC structure refers to an LCC in the form of strands or other structural shapes. An LCC structure also includes an LCC connected or fabricated with at least one components or systems such as a detector, light source, or an electronic system.

Preferably, the LCC comprises a polymeric material. The material comprising the LCC may be polybutylene terephthalate, polyethylene terephthalate, polypropylene, polyethylene, polyisobutylene, polyacrylonitrile, poly(vinyl chloride), poly(methyl methacrylate), silica, or polycarbonate. Preferably, the polymeric material is a photorefractive polymer.

The polymeric material that forms the LCC may be connected to or manufactured as part of engine structures such as intake manifolds. Information obtained from the signal receivers that relates to monitored parameters can then be routed through the LCC to at least one electronic system such as a process control system.

Preferably, the LCC material is made of at least one material that allows the transmission of light of various frequencies. Thus, for example, the LCC may comprise a first material transparent or translucent to a first frequency of the signals and a second material that is transparent or translucent to a second frequency of the signals.

The LCC can have various configurations. Thus, the LCC may be flat, curvilinear, wavy, or asymmetrical. The LCC may also have various dimensions including non-uniform thickness, diameter, width, and length. The LCC may be fabricated using a moldable material so that the LCC can be cast and then cured to a desired shape. The LCC may have sections or areas that are connected, molded, or pressed onto a surface of a circuit board. In one aspect, the LCC is integrated with structures such as printed circuit boards, flexible substrates, flatwire, and MID (Molded in Device) circuits. The entire LCC may be coated with a reflective material. Preferably, the reflective coating minimizes energy loss by reducing the intensity of the optical signal that leaks out of the LCC.

The LCC preferably has a reflective coating on at least one of its surfaces. In one aspect of the invention, the reflective coating covers the entire surface or substantially the entire surface of the LCC except for the portions of the surface where the signal source and signal receivers are operatively connected to the LCC. The reflective coating may be used to, for example, cover only the surface of the LCC that substantially encompass a volume of the LCC through which the signal source is transmitted to the signal receivers.

The reflective coating may comprise any material that reflects the signal transmitted through the LCC. The reflective coating may also comprise at least one metal or metallic alloy containing metals such as aluminum, copper, silver, or gold.

The signal source may be a light source. An example of a preferred light source is an infrared light source. However, the signals can have any electromagnetic frequency capable of transmission through the LCC and communication between the signal source and the signal receivers. The signal being transmitted may be a combination of electromagnetic frequencies. The signal source includes, but is not limited to, an LED, a laser, or an RF source. The laser may emit IR, visible, or ultraviolet light. As used herein, a signal source includes to transmitters and transceivers.

A signal may be directed to any or various directions within the LCC, unless, for example, the signal source or another component blocks the signal. The signals may propagate, sequentially or simultaneously, along the same or opposite directions. The signal receivers may be positioned in any suitable location on a surface of the LCC where the signal receivers can receive a signal from at least one signal source. Multiple signal receivers may receive signals from a single signal source.

The signal source is preferably an electromagnetic radiation generation device. Preferably, each signal source is a light generation device such as a laser or a light emitting diode (LED). Alternatively, each signal source is a radio frequency (RF) generation device such as an RF transmitter. For example, a first signal source may be an electromagnetic radiation generation device such as a LED or a laser and a second signal source may be an RF transmitter.

A signal source and at least one signal receiver may be integrated with a component such as an RF transceiver, which may transmit a first signal at a given time and receive a second signal at another time. The first and second signals may have the same or different frequencies. The signal receivermay include both a detector and another component such as a capacitor where the collected energy may be stored.

Signals such as optical signals from optoelectronic transmitters can be channeled or transported through air if there are no obstacles in their path. The transmitters preferably generate a light signal with a unique wavelength. In an aspect of the invention, a wavelength selective filter is placed in front of the signal receiver so that little or no interference occurs between different transmitters and signal receivers.

As used herein, a signal receiver refers to a device that receives a signal from a given source. The signal received by a signal receiver may be a light signal. Thus, a signal receiver may include at least one component such as a photodetector or both a photodetector and a capacitor. In particular, at least one of the signal receivers may include an electromagnetic radiation reception or collection device such as a photodiode or an RF sensor. The signal receivers include, but are not limited to, photodiodes, microchannel plates, photomultiplier tubes, or a combination of signal receivers. The signal receivers may receive or collect at least one signal through the LCC. In one aspect of the invention, the signal receivers provide an output signal to an electronic system in response to a signal that propagates through the LCC. The signal receivers preferably have at least one frequency specific filters to reduce or eliminate interference from signals with certain frequencies or frequency ranges.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. An integrated control system comprising:
   an integrated circuit that controls at least one component of an engine;
   a first light source that generates a first light signal when triggered through the integrated circuit; and
   an LCC through which the first light signal propagates from the first light source;
   wherein the first light source is operable to communicate simultaneously with a plurality of signal receivers through the LCC and wherein a signal that activates the component of the engine is selected from a group consisting of the first light signal and a signal generated after the first light signal is produced.

2. The integrated control system of claim 1, wherein the integrated circuit is an optoelectronic chip.

3. The integrated control system of claim 1 further comprising a molded cover that can serve as a signal medium.

4. The integrated control system of claim 1, wherein a light signal propagates through an LCC along an edge of a substrate.

5. The integrated control system of claim 1, wherein a light signal propagates at a location on a surface of an LCC where physical scratches or indentations are made to allow the light signal to exit and reach a signal receiver.

6. The integrated control system of claim 1, wherein a coded light signal is used for communication between at least one signal source and at least one signal receiver.

7. The integrated control system of claim 6, wherein the coded light signal comprises a light signal with a single wavelength.

8. The integrated control system of claim 1, wherein communication between a signal source and a plurality of signal receivers occurs through a shared LCC.

9. The integrated control system of claim 1, wherein communication among a plurality of signal sources and a plurality of signal receivers occurs through a shared LCC.

10. The integrated control system of claim 1, wherein a substrate also acts as a signal carrier.

11. The integrated control system of claim 1, wherein a signal source for an ignition system and a signal source for a fuel injection system transmit a signal through a shared LCC.

12. The integrated control system of claim 1, wherein a light signal propagates through an optical fiber molded in a substrate.

13. The integrated control system of claim 1, wherein a signal source is selected from a group consisting of an optoelectronic transmitter and an optoelectronic transceiver.

14. An integrated control system comprising:
   an integrated circuit that controls an ignition system of an engine;
   a first light source that generates a first light signal when triggered through the integrated circuit; and
   an LCC through which the first light signal propagates from the first light source;
   wherein the first light source is operable to communicate simultaneously with a plurality of signal receivers through the LCC and wherein a signal that activates the ignition system of the engine is selected from a group consisting of the first light signal and a signal generated after the first light signal is produced.

15. An integrated control system comprising:

an integrated circuit that controls a fuel injection system of an engine;

a first light source that generates a first light signal when triggered through the integrated circuit; and an LCC through which the first light signal propagates from the first light source;

wherein the first light source is operable to communicate simultaneously with a plurality of signal receivers through the LCC and wherein a signal that activates the fuel injection system of the engine is selected from a group consisting of the first light signal and a signal generated after the first light signal is produced.

16. A method of controlling a combustion process in an engine comprising:

using an integrated circuit in an integrated control system to control a light source;

using the light source to generate a first light signal;

transmitting the first light signal through an LCC to communicate simultaneously with a plurality of signal receivers;

activating a component of a combustion system of the engine using a signal selected from a group consisting of the first light signal and a signal generated after the first light signal is produced.

17. The method of claim 16, wherein the component of the combustion system of the engine comprises an ignition system.

18. The method of claim 17, wherein the component of the combustion system of the engine comprises a fuel injection system.

* * * * *